United States Patent [19]
Gobeil et al.

[11] Patent Number: 6,086,018
[45] Date of Patent: Jul. 11, 2000

[54] INTERLOCKING ASSEMBLY SYSTEM FOR AN AIRCRAFT CABIN

[75] Inventors: Richard W. Gobeil, Los Angeles; Richard B. Palmer, Diamond Bar, both of Calif.

[73] Assignee: McDonnell Douglas Corporation, St. Louis, Mo.

[21] Appl. No.: 08/987,659

[22] Filed: Dec. 9, 1997

[51] Int. Cl.⁷ .............................. B64D 11/06; B60N 2/44
[52] U.S. Cl. .................................... 244/122 R; 296/65.13
[58] Field of Search .......................... 244/122 R, 118.5; 296/65.13, 65.14, 65.15; 248/424, 429, 298.1; 410/77, 78, 80, 130; 403/363, 381

[56] References Cited

U.S. PATENT DOCUMENTS

| | | |
|---|---|---|
| 855,048 | 5/1907 | Curlett . |
| 1,343,234 | 6/1920 | Stevens . |
| 2,676,679 | 4/1954 | Price . |
| 3,266,209 | 8/1966 | Zibell . |
| 3,547,472 | 12/1970 | Ehrman . |
| 4,185,799 | 1/1980 | Richards, Jr. . |
| 4,455,046 | 6/1984 | Linderoth . |
| 4,509,888 | 4/1985 | Sheek .................................. 244/122 R |
| 4,703,603 | 11/1987 | Hills . |
| 4,796,837 | 1/1989 | Dowd .................................. 244/122 R |
| 4,843,792 | 7/1989 | Rogers et al. . |
| 4,911,381 | 3/1990 | Cannon et al. . |
| 4,936,527 | 6/1990 | Gorges . |
| 4,956,956 | 9/1990 | Maier et al. . |
| 4,962,914 | 10/1990 | Taylor . |
| 5,058,347 | 10/1991 | Schuelke et al. . |
| 5,078,530 | 1/1992 | Kim . |
| 5,088,841 | 2/1992 | Ikegaya et al. . |
| 5,178,346 | 1/1993 | Beroth ................................. 244/122 R |
| 5,265,828 | 11/1993 | Bennington . |
| 5,284,401 | 2/1994 | Harley . |
| 5,383,630 | 1/1995 | Flatten . |
| 5,400,554 | 3/1995 | Lo . |
| 5,529,378 | 6/1996 | Chaban et al. ........................... 297/331 |
| 5,537,795 | 7/1996 | Dias . |
| 5,558,369 | 9/1996 | Cornea et al. . |
| 5,580,204 | 12/1996 | Hultman . |
| 5,871,318 | 2/1999 | Dixon ................................. 244/118.5 |

FOREIGN PATENT DOCUMENTS 3603707  8/1987  Germany .

*Primary Examiner*—Charles T. Jordan
*Assistant Examiner*—Charles R. Ducker, Jr.
*Attorney, Agent, or Firm*—Alston & Bird LLP

[57] ABSTRACT

The interlocking assembly system includes a seat track, a floor beam and a clip for connecting the seat track to the underlying floor beam. The clip includes first and second clip members that cooperate to engage the opposed edges of the floor beam. Each clip member has a beam attachment portion, typically including an inward sill, for engaging the respective beam edge once the clip members have been slidably engaged. Additionally, the first clip member includes an elongate tongue extending away from the respective beam attachment portion. In addition, the second clip member includes a pair of elongate rails that extend away from the respective beam attachment portion and are spaced apart to define a lengthwise extending channel that is sized to slidably receive the elongate tongue. Once the lengthwise extending channel has received the elongate tongue, the clip members can be secured by a fastener. Thereafter, the seat track can be slid or snapped onto the clip. In addition to securely mounting a seat track to the underlying floor beam, the interlocking assembly system permits panels, such as floor panels, to be installed in a simplified manner. In this regard, a panel assembly is provided that includes a panel, a rail mounted to an edge of the panel, and a cam lock assembly mounted at least partially to the rail for connecting the panel to an adjacent structure, such as a seat track.

16 Claims, 11 Drawing Sheets

INTERLOCKING ASSEMBLY SYSTEM FOR AN AIRCRAFT CABIN

BACKGROUND OF THE INVENTION

The present invention relates to an improved fastener assembly and, more particularly, a fastener assembly for mounting seat tracks and floor panels within an aircraft cabin with fewer parts and requiring reduced installation time.

In most modern day commercial passenger aircraft, the seats are mounted to two underlying seat tracks. These seat tracks generally extend lengthwise along the passenger compartment of an aircraft such that two or more seats can be mounted thereto. The seat tracks are, in turn, securely mounted to the floor beams located within the undercarriage of the aircraft. The floor beams generally run perpendicular to the seat tracks, that is, the floor beams typically run laterally beneath the passenger compartment of an aircraft. The seat tracks and floor beams are usually made of a relatively strong metal or metal alloy in order to withstand the relatively high loading forces.

Normally, the seat tracks are mounted to the floor beams using thousands of individual fasteners. For example, during installation, a seat track is typically placed across the floor beams and is fastened thereto by means of the fasteners. In particular, the seat track is attached to each of the underlying floor beams by at least four fasteners, such as threaded fasteners or weldments. Although the seat track is firmly attached to the underlying floor beams, this installation method requires a large number of parts and increases the weight of the resulting aircraft, thereby increasing the overall production and operational costs. In addition, since holes are generally drilled or otherwise formed in both the seat tracks and the floor beams in order to receive each of the fasteners, the structural integrity of the seat tracks and the floor beams is somewhat compromised. As will be apparent to those skilled in the art, the assembly process is further complicated by the relatively confined space in which the fasteners must be installed. As such, this installation method quickly becomes time consuming in view of the large numbers of fasteners which must be installed and the limited space available for installation.

A number of specific fasteners have been developed for connecting seat tracks and floor beams. For example, U.S. Pat. No. 4,185,799 to Edward W. Richards, Jr., describes a fastener assembly for use in aircraft that disadvantageously employs a large number of parts. In particular, the fastener assembly of the Richards '799 patent includes a plurality of relatively small components cooperably attached with a series of screws, bolts, and rivets. Similarly, U.S. Pat. No. 4,936,527 to Frederick J. Gorges discloses a related assembly system for connecting an automobile seat and respective seat track with a multitude of rollers, levers, and joints.

Modern commercial passenger aircraft also require a number of panels to be installed so as to form the floor, the galley, the lavatories, etc. For example, floor panels are oftentimes connected to the seat tracks and, in turn, to the floor beams with a number of individual fasteners, such as threaded fasteners. As such, the installation and interconnection of the various panels consumes even more time and further increases installation costs.

To remain competitive in today's market, increasing emphasis is being placed upon cost reduction. It would therefore be advantageous to install seat tracks and panels, such as floor panels, in a manner that reduces the part count, weight and installation time.

SUMMARY OF THE INVENTION

The interlocking assembly system of the present invention addresses many of the deficiencies associated with the conventional techniques for attaching seat tracks and panels, such as floor panels, within an aircraft cabin. For example, the interlocking assembly system advantageously reduces the part count and the resulting installation time by providing clip fasteners for connecting the seat tracks to the floor beams. In contrast to conventional seat track installation in which the seat track is substantially permanently affixed to the floor beam by the multitude of fasteners, the seat tracks and associated clip fasteners of the present invention permit the seat tracks to be removed in a reasonably quick fashion. Additionally, the interlocking assembly system does not require holes to be drilled or otherwise formed in the seat tracks and the floor beams, thereby maintaining the structural integrity of the seat tracks and the floor beams.

The interlocking seat track assembly system includes the seat track, the floor beam and the clip for connecting the seat track to the underlying floor beam. The clip includes first and second clip members that cooperate to engage the opposed edges of the floor beam. Each clip member has a beam attachment portion, typically including an inward sill, for engaging the respective beam edge once the clip members have been slidably engaged. Additionally, the first clip member includes an elongate tongue extending away from the respective beam attachment portion. In addition, the second clip member includes a pair of elongate rails that extend away from the respective beam attachment portion and are spaced apart to define a lengthwise extending channel that is sized to slidably receive the elongate tongue. Once the lengthwise extending channel has received the elongate tongue, the clip members can be secured by a fastener. In this regard, the second clip member can include a tab defining a hole and extending away from the beam attachment portion in a direction opposite the rails. The elongate tongue of the first clip member also defines a hole positioned such that the holes of the first and second clip members are aligned once the elongate tongue is received within the lengthwise extending channel of the second clip member. Once aligned, a fastener can be inserted through the holes.

According to the present invention, the elongate rails of the second clip member also include lengthwise extending lips that engage corresponding tabs of the seat track in order to securely mount the seat track to the floor beam. In this regard, the seat track generally has a U-shape so as to define an inner channel with respective inner and outer surfaces. The seat track also includes a pair of tabs that extend into the inner channel from opposed portions of the inner sidewall. The tabs are adapted to slidably engage the lengthwise extending lips defined by the elongate rails.

The seat track can advantageously include a number of lobes extending outwardly from the outer surface for engaging components, such as seats and floor panels. The lobes include a stem and outer bulbous structure. For a seat track having a U-shaped body portion with a connecting portion and a pair of side portions connected to opposed ends of the connecting portion, the stem of the lobe extending outwardly from the connecting portion preferably includes a scalloped construction to facilitate seat alignment.

Once the first and second clip members have been cooperably mated about the floor beam so as to secure the seat track to the floor beam, the clip members can be connected by means of a fastener. According to one advantageous embodiment of the present invention, the fastener includes a longitudinally extending shaft and an annular ferrule mounted upon a predefined portion of the shaft. The shaft generally includes first and second portions with the first portion being larger in lateral cross-section than the second portion. The opposed ends of the shaft also include first and second rings proximate the first and second portions, respectively. The first ring is preferably larger in lateral cross-section than the first portion of the shaft, while the second ring is preferably larger in lateral cross-section than the second portion of the shaft, but is smaller in lateral cross-section than the first ring.

The annular ferrule defines a lengthwise extending channel extending between opposed first and second ends. The annular ferrule also defines a slit which permits the ferrule to elastically deform as the ferrule is advanced over the second ring so as to mount the ferrule upon the second portion of the shaft. Once properly mounted, the first end of the ferrule is proximate the first portion of the shaft and the second end of the ferrule is proximate the second ring of the shaft. In order to retain the ferrule upon the second portion of the shaft, the portion of the channel defined by the ferrule that is adjacent the first end of the ferrule is smaller in lateral cross-section than the first portion and the portion of the channel defined by the ferrule that is adjacent the second end of the ferrule is smaller in lateral cross-section than the second ring.

The ferrule preferably has a rounded outer surface and, more preferably, has a semi-spherical outer surface. According to this embodiment, at least portions of the rounded outer surface of the ferrule are larger in lateral cross-section than the first portion of the shaft. As such, once the shaft has been extended through the respective apertures defined by the first and second clip members, the ferrule can be urged over the second ring of the shaft and mounted upon the second portion of the shaft. The clip members are therefore secured between the ferrule on one side and the first ring of the shaft of the fastener on the other side.

The floor beam may be any one of several forms, each having an upper surface extending between two opposed edges. The opposed edges engage the beam attachment portions of the respective clip members to securely fasten the clip and, in turn, the seat track to the floor beam. In a preferred embodiment, the floor beam defines a notch in each opposed edge for cooperably receiving the beam attachment portions of the respective clip members to prevent displacement of the clip once the beam attachment portions have engaged the opposed edges of the floor beam. For example, the notches defined by the floor beam generally have a predetermined depth which is substantially equal to the predetermined thickness of the beam attachment portions in order to lock the clip members in position relative to the underlying floor beam.

Therefore, the clip of the present invention requires very few components in order to securely mount a seat track to an underlying floor beam, thereby simplifying the installation procedure and reducing the time required to install the clip. The interlocking seat track assembly system of the present invention also permits the clips to be readily removed, if desired, in order to remove the seats and/or floor panels without damaging the clip, the seat track or the floor beam. Further, the interlocking seat track assembly system maintains the structural integrity of the seat tracks and the floor beams by mounting the seat tracks to the floor beams without requiring holes to be drilled or otherwise formed in the seat tracks or the floor beams.

In addition to securely mounting a seat track to the underlying floor beam, the interlocking assembly system of the present invention permits panels, such as floor panels, to be installed in a simplified manner. In this regard, a panel assembly is provided that includes a panel such as a floor panel, a rail mounted to an edge of the panel, and a cam lock assembly mounted at least partially to the rail for connecting the panel to an adjacent structure, such as a seat track. The rail includes at least one flange extending outwardly in a direction away from the panel and defining at least one aperture. The cam lock assembly is therefore designed to engage the rail by extending through a respective aperture defined by the flange. As such, the cam lock assembly includes a head portion, a shaft portion extending outwardly from the head portion and a semi-circular cam mounted upon the shaft and adapted for rotation therewith. The shaft portion is designed to extend through the respective aperture defined by the flange such that the rail and, in turn, the panel is connected to an adjacent structure, such as to seat track, as the cam is rotated and engaged within a corresponding recess defined by the adjacent structure.

In one advantageous embodiment, the cam lock assembly also includes a base mounted to the end of the shaft opposite the head portion to thereby secure the cam upon a medial portion of a shaft. The base preferably includes a tubular portion open at one end for receiving the end of the shaft opposite the head portion. In this regard, the end of the shaft opposite the head portion can include a reduced diameter portion and the tubular portion of the base can include a corresponding inwardly extending rib for engaging the reduced diameter portion of the shaft as the end of the shaft opposite the head portion is inserted into the base. The end of the shaft opposite the head portion can also define at least one slit extending through the reduced diameter portion to permit the end of the shaft opposite the head portion to compress as the shaft is inserted into the base. The base also preferably includes an enlarged head portion mounted to an end of the tubular portion opposite the open end. In order to force the cam to rotate with the shaft, the medial portion of the shaft is preferably rectangular in shape. As such, the cam preferably defines a correspondingly shaped opening such that the cam rotates with the shaft once the cam is mounted upon the rectangularly shaped medial portion of the shaft.

Preferably, the rail includes a pair of flanges extending outwardly in a spaced apart relationship in a direction away from the panel. As such, the cam can be positioned between the pair of flanges. The flange also preferably defines a recess adjacent to the aperture for receiving a head portion of the cam lock assembly such that the head portion of the cam lock assembly is flush with an outer surface of the rail.

The cam lock assembly can connect a panel, such as a floor panel, to a number of other adjacent structures. In one advantageous embodiment, however, the cam lock assemblies connect the floor panels to the seat tracks described above. In this embodiment, the outer bulbous structure of at least one lobe extending outwardly from a side portion of the seat track preferably includes a recessed portion for receiving and engaging the semi-circular cam, thereby securely connecting the panel assembly, including the floor panel, to the seat track.

Therefore, the interlocking assembly system of the present invention also permits panels, such as floor panels, to be securely connected to adjacent structures, such as the seat track of the present invention with very few components, thereby simplifying the installation procedure and reducing the time required to mount the panels. The interlocking assembly system of the present invention also permits the cam lock assemblies to be readily removed, if desired, in order to remove the panels in an efficient manner without damaging the cam lock assembly, the panel or the seat track.

BRIEF DESCRIPTION OF THE DRAWINGS

FIG. 4A is a cross-sectional view of the clip of FIG. 4 taken along line 4A—4A.

FIG. 4B is a cross-sectional view of the clip of FIGS. 4 and 4A taken along line 4B—4B of FIG. 4A.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
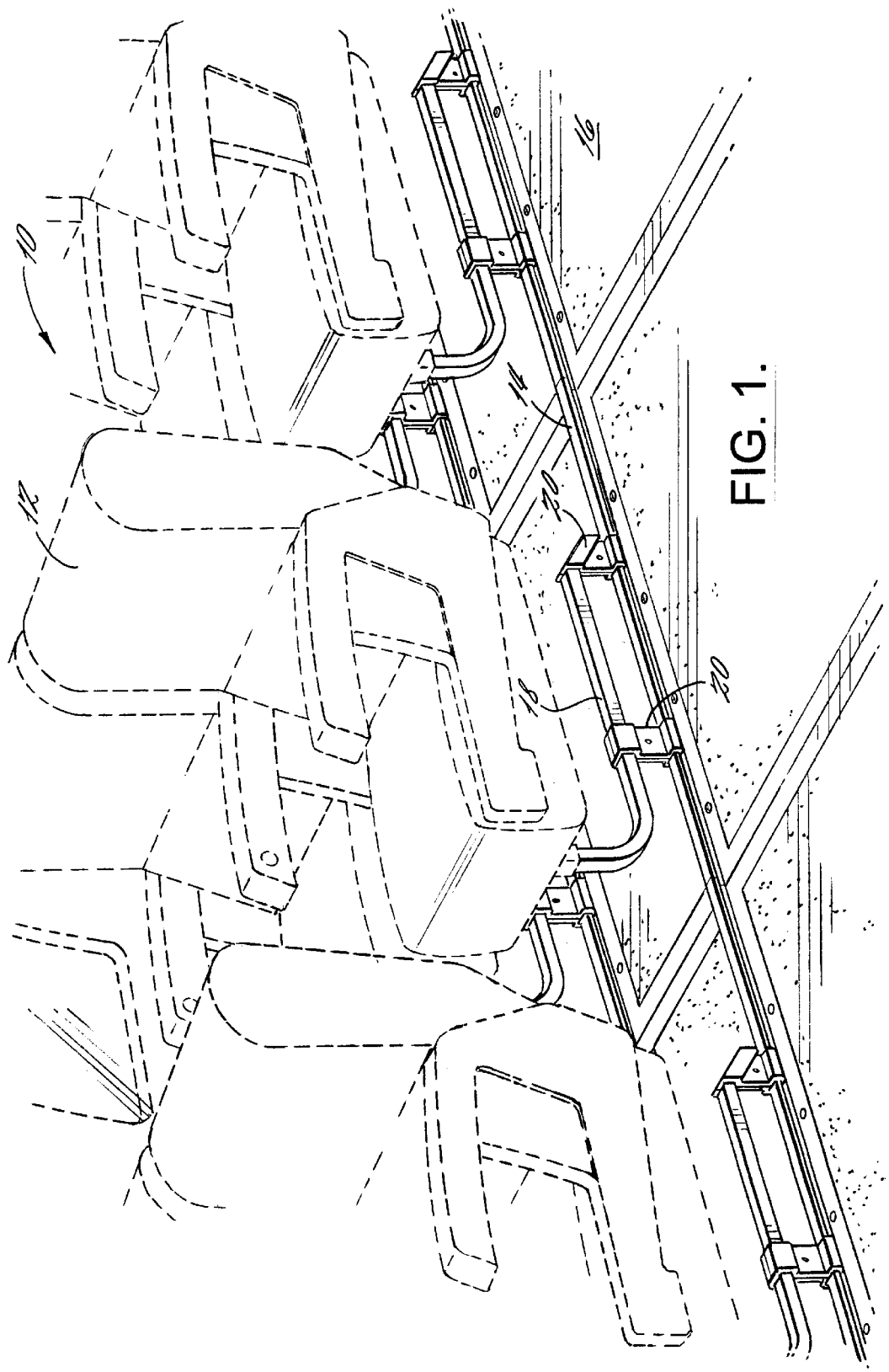
FIG. 1 is a perspective view of an aircraft cabin that utilizes one embodiment of an interlocking assembly system of the present invention.

Referring now to FIG. 1, a portion of an aircraft cabin 10 is illustrated. As shown, a number of seats 12 are mounted to seat tracks 14 which extend lengthwise throughout at least a portion of the aircraft cabin. As also shown, the floor of the aircraft cabin can be formed of a number of interconnected floor panels 16. Although not illustrated, a number of interconnected panels also typically form other portions of the aircraft cabin, such as the partitions which define the lavatories and the galley.

Figure 2:
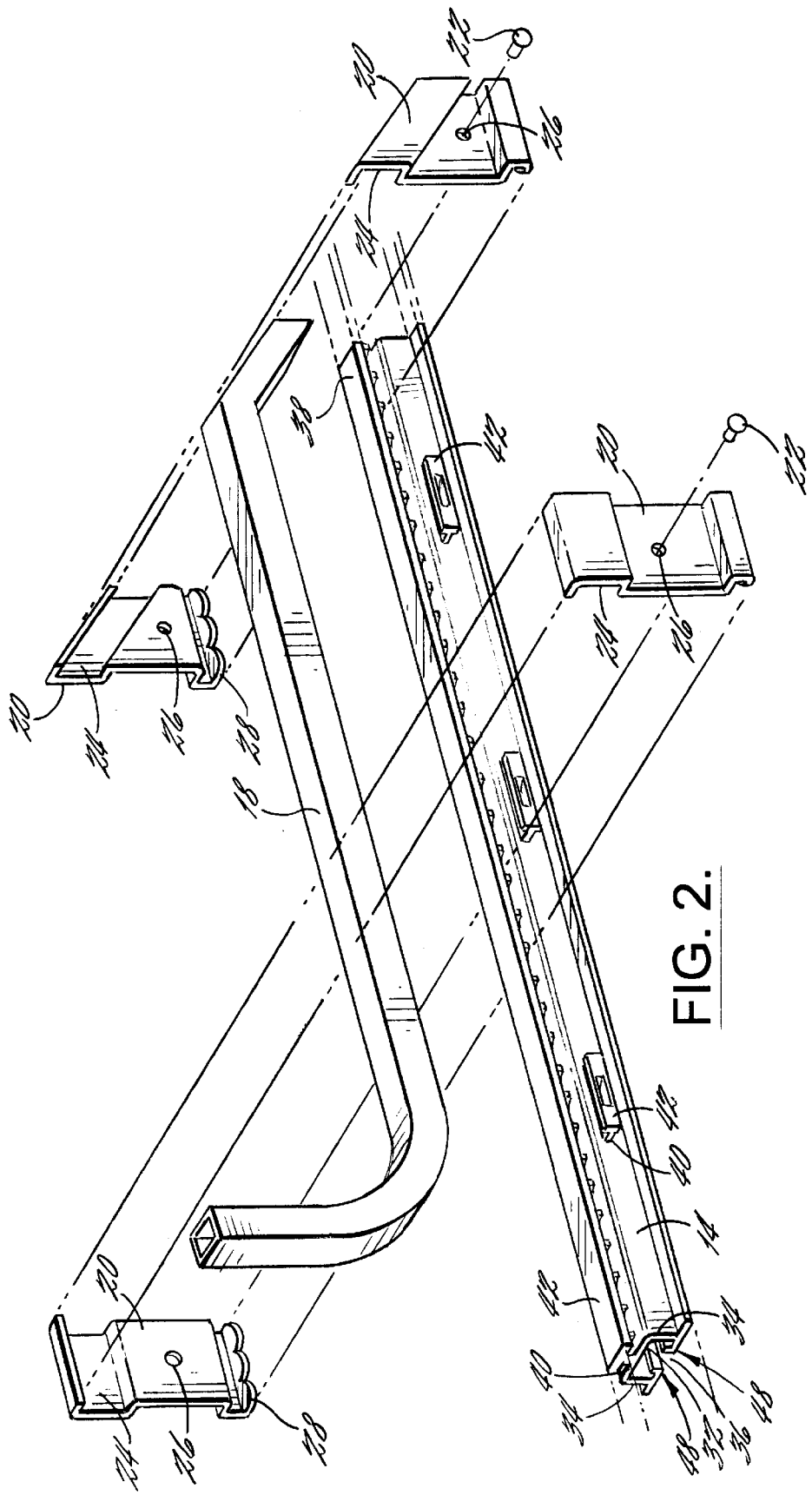
FIG. 2 is an exploded perspective view of a seat track and associated seat mounting components according to the embodiment of the present invention illustrated in FIG. 1.

As shown in more detail in FIG. 2, the seats 12 are generally mounted to a seat track 14 with a number of seat mounting components. These seat mounting components include a curved leg 18 that extends downwardly from a lower portion of the seat. Several seat mounting brackets 20 are adapted to engage the leg and to mount the leg to the seat track. In this regard, the leg can be mounted to the seat track by means of two or more pairs of seat mounting brackets that are spaced apart along the length of the leg. Each pair of seat mounting brackets includes first and second mounting brackets that are connected, such as by means of a fastener 22 so as to securely grip the leg therebetween. For example, each of the mounting brackets can include a groove 24 sized and shaped to receive a portion of the leg. Each mounting bracket also defines an aperture 26 through which the fastener extends. Furthermore, each mounting bracket also includes a scalloped portion 28 for engaging the seat track as described below.

The seat track 14 is, in turn, mounted to at least one and, more preferably, two or more floor beams 30 that generally extend from side-to-side beneath the floor of the aircraft cabin 10. As such, the seats 12 are effectively secured to the floor beams and the remainder of the support frame of the aircraft as a result of the secure mounting of the seats to the seat tracks. According to the present invention, the seat track includes the generally U-shaped body portion. While the seat track is generally formed of a metal, such as titanium or aluminum, the seat track can be formed of other materials as will be apparent to those skilled in the art. The body portion generally includes a connecting portion 32 and a pair of side portions 34 extending downwardly from opposed edges of the connecting portions to form the generally U-shape. The body portion also includes an outer sidewall and an opposed inner sidewall that defines a lengthwise extending inner channel 36.

Figure 3:
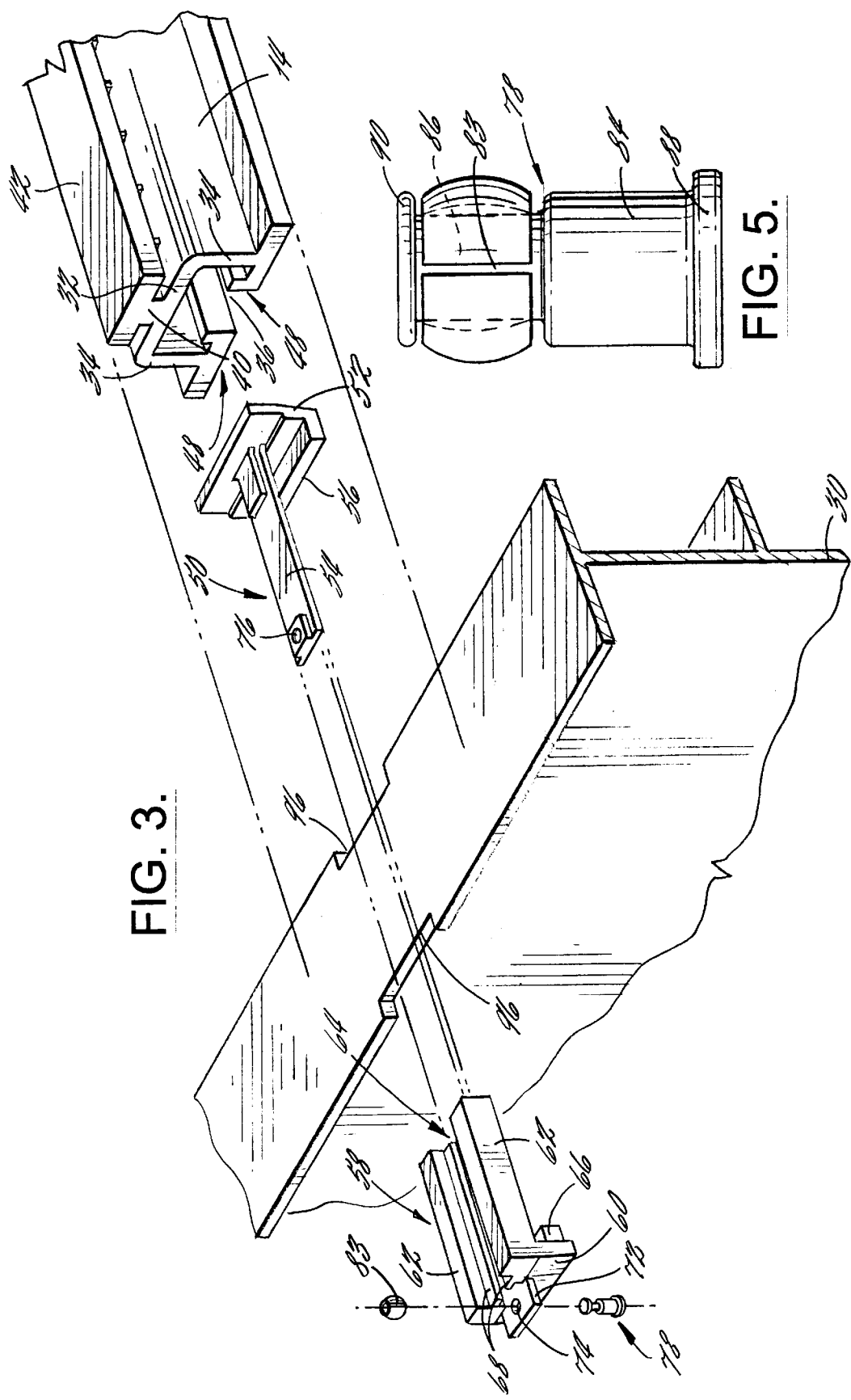
FIG. 3 is an exploded perspective view of an interlocking seat track assembly system, including a clip, a seat track and a floor beam, according to one advantageous embodiment of the present invention.
Figure 4:
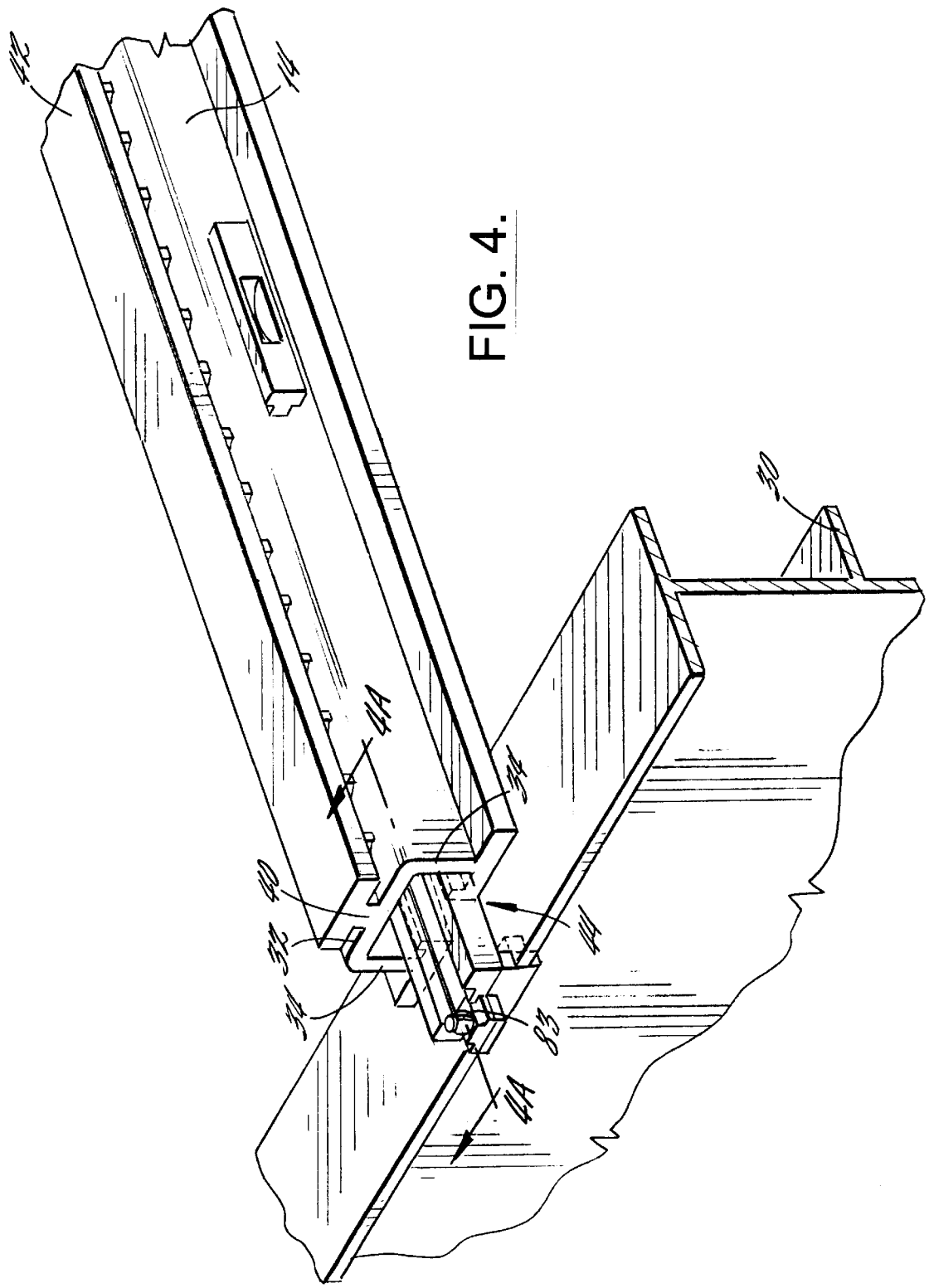
FIG. 4 is a perspective view of the interlocking seat track assembly system of FIG. 3 following assembly.
Figure 13:
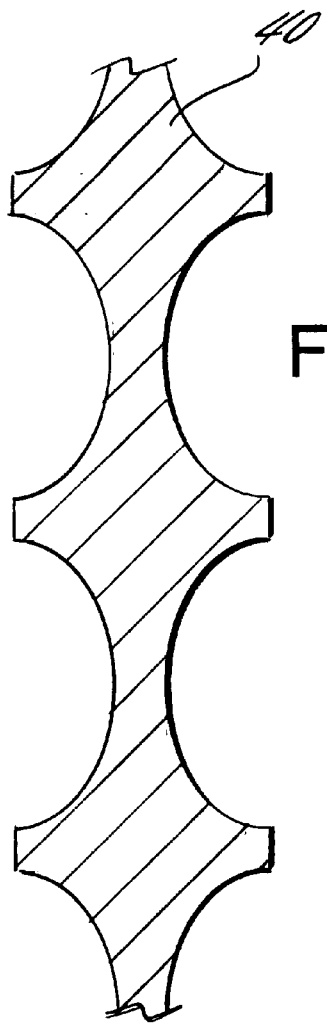
FIG. 13 is a cross-sectional view of the scalloped stem of the lobe which extends outwardly from the connecting portion of the U-shaped seat track according to one advantageous embodiment of the present invention.
Figure 14:
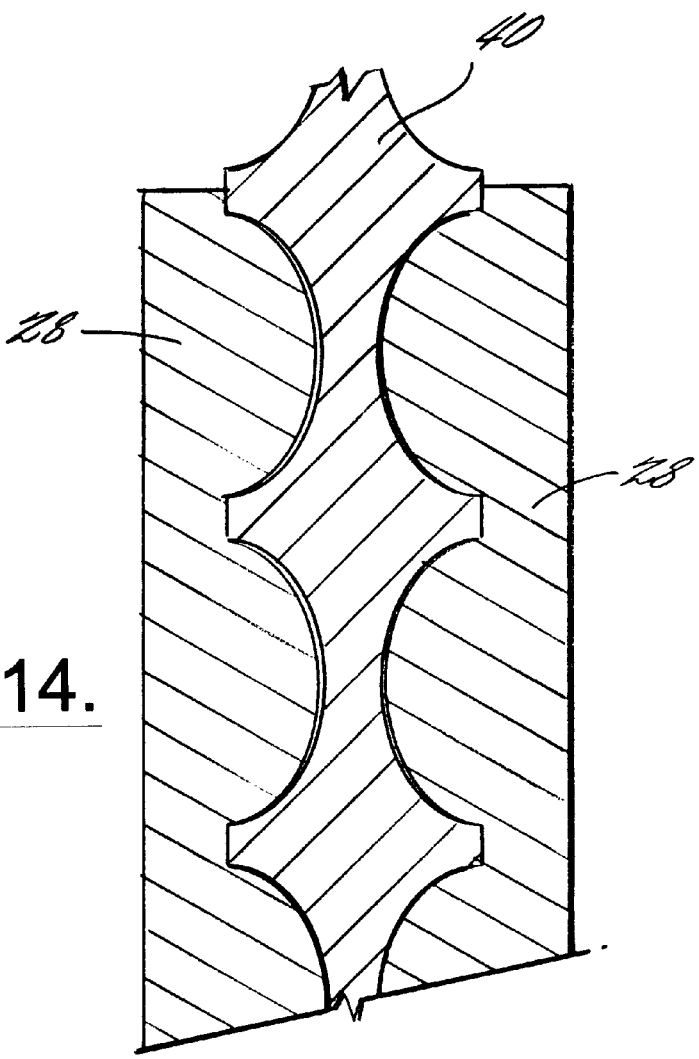
FIG. 14 is a cross-sectional view of the scalloped construction of the stem of the lobe which extends outwardly from the connecting portion of the U-shaped seat track according to one advantageous embodiment of the present invention following engagement of the scalloped stem by the seat mounting components which also include a scalloped engagement surface.

The seat track 14 also includes a plurality of lobes 38 extending outwardly from the outer sidewall. Each lobe includes a stem 40 and an outer bulbous structure 42. As shown in FIGS. 2–4, one lobe preferably extends outwardly from the connecting portion 32 of the seat track to form a generally T-shaped rib that extends lengthwise therealong. As shown in FIG. 13, the stem is preferably scalloped to facilitate mounting of a seat 12 to the seat track. As shown in FIG. 2 and in cross section in FIG. 14, each mounting bracket 20 preferably includes a scalloped portion 28 which mates with the scalloped stem of the lobe extending outwardly from the connecting portion of the seat track. As such, the seat mounting bracket and, in turn, the seat are securely mounted to the seat track in a manner which significantly restricts, if not eliminates, slippage or other movement of the mounting brackets in a lengthwise direction relative to the seat track.

The interlocking seat track assembly system of the present invention also includes a clip 44 for attaching the seat track 14 to a respective floor beam 30. Thus, the seat track can also include a pair of generally L-shaped tabs 48 extending inwardly and upwardly from opposed portions of the inner sidewall into the inner channel 36. The tabs are adapted to engage the clip so as to mount the seat track to the floor beam as described below. As such, the tabs are generally spaced along the length of the seat track at the same spacing as the floor beams.

As shown in FIGS. 3 and 4, the clip 44 includes first and second clip members. The first clip member 50 includes a beam attachment portion 52 and an elongate tongue 54 extending away from the beam attachment portion. As shown, the beam attachment portion generally includes a wall that extends generally perpendicular to the elongate tongue. The beam attachment portion can also include an inwardly extending sill 56 that engages a lower surface of the floor beam 30 as described hereinbelow. The second clip member 58 also includes a beam attachment portion 60 and two elongate rails 62 extending away from the beam attachment portion and spaced apart to define a lengthwise extending channel 64 therebetween. As described in conjunction with the first clip member, the beam attachment portion of the second clip member generally includes a wall that extends substantially perpendicular to the pair of elongate rails and a sill 66 that extends in the same direction as the pair of elongate rails for engaging a lower surface of the floor beam as described hereinbelow.

As shown in cross-section in FIG. 4A, the lengthwise extending channel 64 of the second clip member 58 is sized to slidably receive the elongate tongue of the first clip member 50 so that the respective beam attachment portions of the first and second clip members engage the floor beam 30. In order to prevent the elongate tongue from becoming displaced from the lengthwise extending channel defined by the second clip member, the second clip member preferably includes a lengthwise extending lip 68 that extends inwardly into the channel from a medial portion of each of the elongate rails 62. In addition, the lower portions of the pair of elongate rails are preferably joined by a lower surface 70 that serve as a floor for the lengthwise extending channel. As such, the elongate tongue of the first clip member can be slidably inserted into the channel of the second clip member in the space defined between the lower surface of the second clip member and the lengthwise extending tabs 48 which extend inwardly and upwardly into the channel from each of the elongate rails of the second clip member. As a result of the construction of the clip, however, the elongate tongue cannot be lifted out of the lengthwise extending channels.

During installation, the seat tracks 14 are initially laid across and positioned relative to the floor beams 30 such that the generally L-shaped tabs 48 that extend inwardly and upwardly from opposed portions of the inner sidewall into the inner channel 36 are in general alignment with the floor beams. The first and second clip members are then positioned on opposite sides of a floor beam 30 as shown in FIG. 3 in which the seat tracks have been lifted from the floor beam for purposes of illustration. The elongate tongue 54 of the first clip member 50 is then inserted into the lengthwise extending channel 64 defined by the second clip member 58. Once the elongate tongue has been fully inserted, the sills which extend outwardly from the beam attachment portions of the first and second clip members hook beneath the lower surface of the floor beam.

In order to retain the first and second clip members in an assembled position relative to the floor beam 30, the first and second clip members are interconnected. In this regard, the second clip member 58 preferably includes a tab 72 extending away from the beam attachment portion 60 in a direction opposite the elongate rails 62. As shown in FIG. 3, the tab defines a hole 74 therethrough. The elongate tongue 54 of the first clip member 50 of this embodiment also defines a hole 76 that is positioned such that the holes are aligned once the elongate tongue is slidably received within the lengthwise extending channel 64 of the second clip member. A fastener 78 can then be inserted through the aligned holes to securably interconnect the first and second clip members in a manner which securely mounts the clip 44 to the floor beam. See FIG. 4B.

Figure 5:
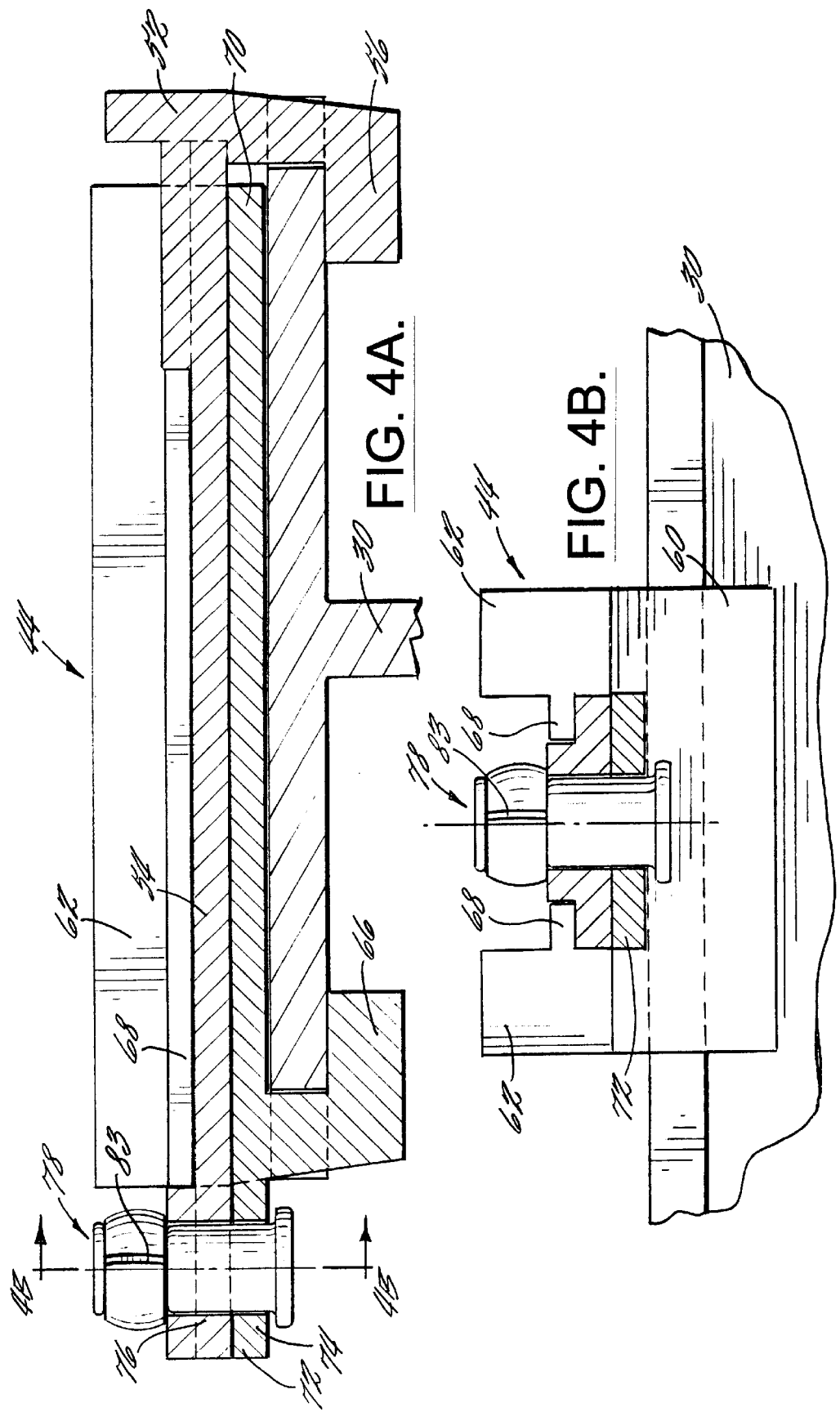
FIG. 5 is a plan view of a fastener according to one embodiment of the present invention that includes a shaft and a ferrule mounted upon a second portion of the shaft for securely coupling first and second clip members.

The first and second clip members can be fastened by any number of fasteners, including threaded fasteners. According to one advantageous embodiment of the present invention, a unique fastener is provided for interconnecting the first and second clip members in a manner which minimizes the part count and reduces the installation time and labor costs in comparison with conventional aircraft seat mounting systems. In this embodiment, the fastener 78 includes a longitudinally extending shaft 80 and an annular ferrule 82 mounted upon a portion of the shaft. As shown in FIGS. 3 and 5, the shaft generally has a stepped diameter and, more particularly, includes first and second portions that are sized such that the first portion 84 is larger in lateral cross section than the second portion 86. The shaft also includes a first ring 88 proximate the end of the first portion that is opposite the second portion and a second ring 90 proximate the end of the second portion that is opposite the first portion. Therefore, the first and second rings generally form the opposed ends of the shaft. As shown, the first ring is larger in lateral cross section than the first portion and the second ring is larger in lateral cross section than the second portion. However, the second ring is preferably smaller in lateral cross section than the first ring such that the second ring can be inserted through the holes defined by the first and second clip members. However, the first ring is sized to have a diameter larger than the diameter of the holes defined by the first and second clip members such that the first ring limits further advancement of the shaft through the holes.

Once the shaft 80 has been inserted through the aligned holes defined by the first and second clip members, the annular ferrule 82 is advanced over the second ring 90 and is mounted upon the second portion 86 of the shaft. As such, the annular ferrule defines a lengthwise extending channel extending between opposed first and second ends. The diameter of the lengthwise extending channel defined by the ferrule is slightly less than the diameter of the second ring of the shaft. As illustrated, however, the annular ferrule preferably defines a slit 83 which permits the ferrule to elastically deform as the ferrule is advanced over the second ring such that the ferrule can be mounted upon the second portion of the shaft. In order to further facilitate the elastic deformation of the ferrule, the ferrule preferably has relatively thin walls. By way of example, for a ferrule formed of spring steel, the annular ferrule will preferably have a wall thickness of between about 0.010 inch and about 0.014 inch. The ferrule can be formed of other materials, however, in which case the wall thickness of the annular ferrule must be appropriately sized such that the ferrule can elastically deform as the ferrule is advanced over the second ring. Due to the elastic nature of the deformation, the ferrule is securely mounted upon the second portion of the shaft and cannot be removed from the shaft during normal operating conditions of the interlocking seat track assembly system. In this regard, the channel defined by the ferrule is smaller in lateral cross section than both the first portion of the shaft and the second ring that abut the opposed ends of the ferrule.

Once the shaft 80 has been inserted through the aligned holes of the first and second clip members and the ferrule 82 has been mounted upon the second portion 86 of the shaft, the first and second clip members are securely interconnected. In this regard, the fastener 78 retains the first and second clip members upon the first portion 84 of the shaft between the first ring 88 and the annular ferrule. Accordingly, both the first ring and at least a portion of the annular ferrule are larger in lateral cross-section than the aligned holes. As shown in FIGS. 3–5, for example, the ferrule preferably has a rounded outer surface, such as a semi-spherical outer surface, that has at least one portion that is larger in lateral cross section than both the first portion of the shaft and the aligned holes.

Figure 15:
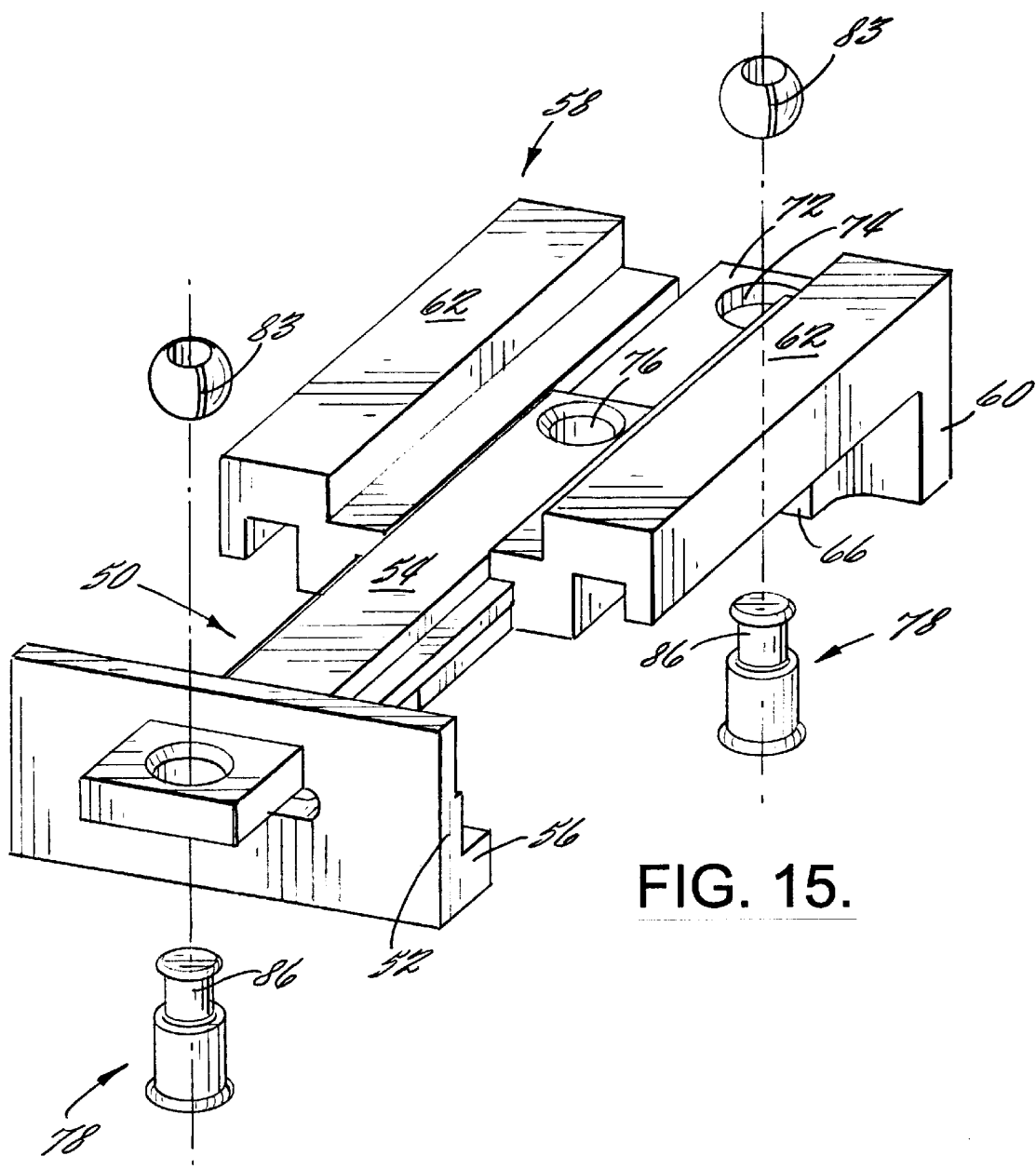
FIG. 15 is a perspective view of a clip according to an alternative embodiment of the present invention.

Although only one end of the clip 44 described above must be fastened in order to securely mount the clip to the floor beam 30, an alternative embodiment of the clip illustrated in FIG. 15 includes a pair of fasteners for joining the opposite ends of the clip. Although the clip of FIG. 15 is shown to include a pair of snap-on fasteners 78 as described above, the clip could include other types of fasteners, such as threaded fasteners, without departing from the spirit and scope of the present invention.

During installation, the seat tracks 14 are generally positioned upon the floor beams 30 such that the tabs 48 that extend into the inner channel 36 of the seat track 14 are aligned with the floor beams. The clip 44 is then slid over the tabs 48 that extend into the inner channel 36 of the seat track 14 such that the tabs 48 are positioned between the elongate rails 62 of the second clip member 58 and the floor beam 30. See, for example, FIG. 4 in which one seat track has been removed for purposes of illustration. As shown, the lower surface 70 of the second clip member spaces the elongate rails away from the floor beam by a separation distance that equals or is slightly larger than the thickness of the tabs that extend into the inner channel of the seat track such that the inwardly extending tabs of the seat track are securely engaged between the elongate rails of the second clip member and the floor beam.

As shown in FIG. 3, the floor beam 30 preferably defines a notch 96 in each opposed edge for engaging the beam attachment portion of the respective clip members. By engaging the beam attachment portions of the respective clip members, the interlocking seat track assembly system of the present invention prevents displacement along the lengthwise extending floor beam. Each notch preferably has a predetermined depth that is substantially equal to the predetermined thickness of the respective beam attachment portion such that the beam attachment portions do not protrude significantly beyond the outer edges of the floor beam.

As described above, the clip 44 of the present invention requires very few components in order to securely mount a seat track 14 to an underlying floor beam 30, thereby simplifying the installation procedure and reducing the time required to install the clip. The interlocking seat track assembly system of the present invention also permits the clips to be readily removed, if desired, in order to remove the seats 12 and/or floor panels 16 without damaging the clip, the seat track or the floor beam. Further, the interlocking seat track assembly system maintains the structural integrity of the seat tracks and the floor beams by mounting the seat tracks to the floor beams without requiring holes to be drilled or otherwise formed in the seat tracks or the floor beams.

In addition to securely mounting a seat track 14 to the underlying floor beam 30, the interlocking assembly system of the present invention permits panels, such as floor panels 16, to be installed in a simplified manner. As shown in FIG. 1, for example, floor panels can also be attached to the seat tracks in order to form the floor of an aircraft cabin 10. According to this aspect of the present invention, the seat tracks include a plurality of lobes 38 that extend outwardly from at least one and, more commonly, both side portions 34 of the U-shaped body portion. In this embodiment, the outer bulbous structure 42 defines a recessed portion 97 that serves to attach the floor panel to the seat track as described below.

Figure 6:
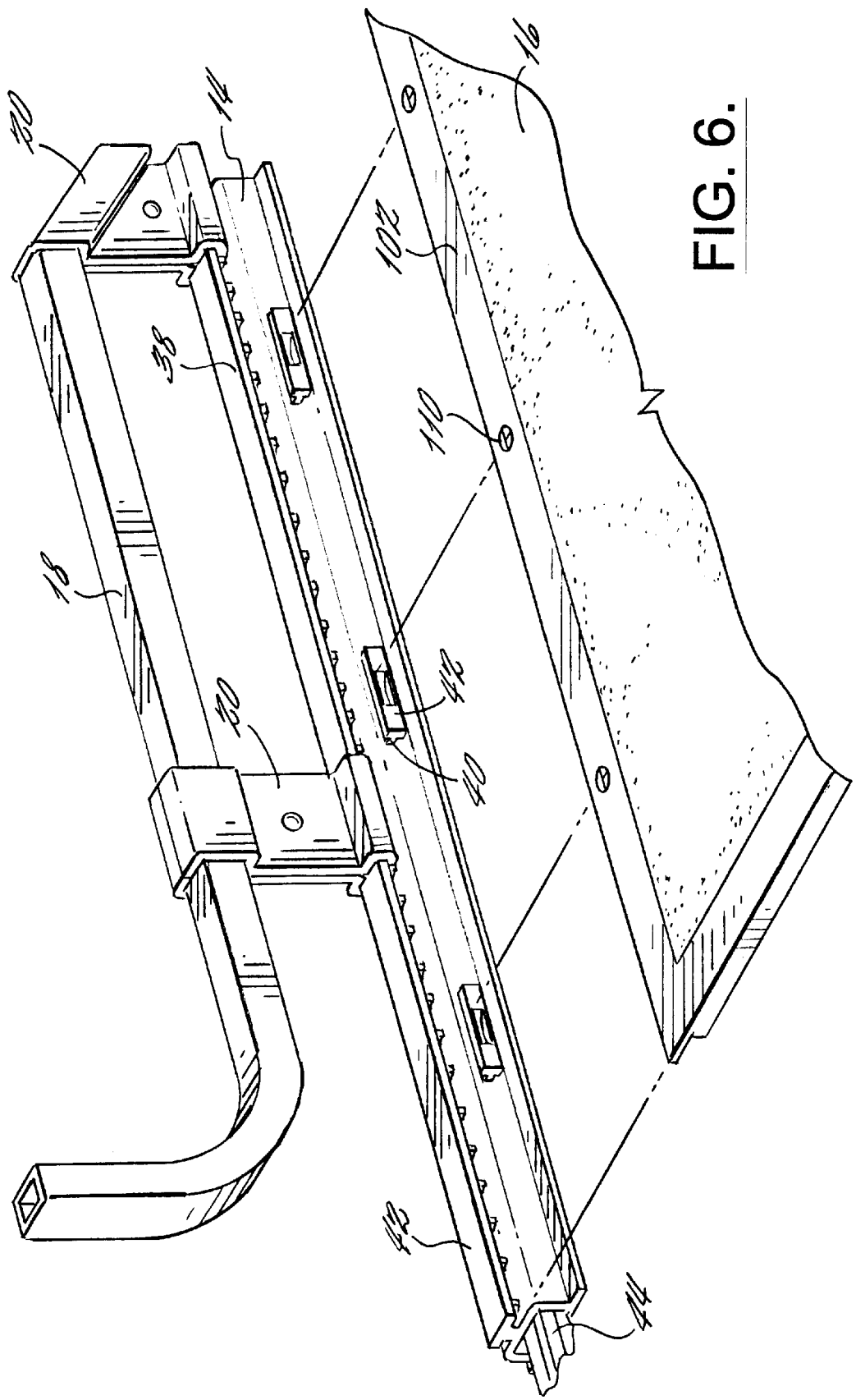
FIG. 6 is a perspective view of a portion of an interlocking assembly system of one embodiment of the present invention which illustrates the connection of a floor panel to a seat track.
Figure 7:
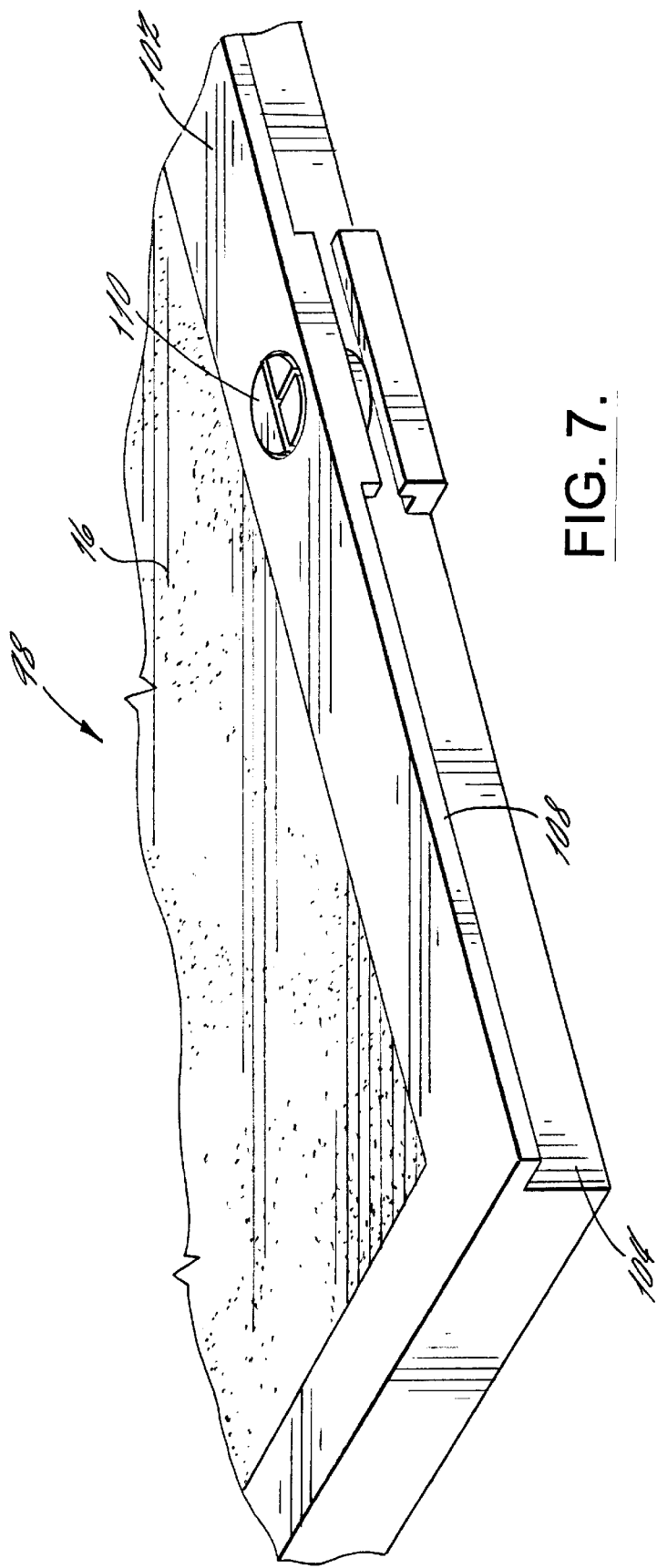
FIG. 7 is a perspective view of a panel assembly including number of cam lock assemblies according to one embodiment of the present invention.

As shown in FIGS. 6 and 7, one advantageous embodiment of the present invention includes a panel assembly 98 including a panel 16 and a rail 102 mounted to an edge of the panel and generally extending circumferentially about the panel. Although the panel will be hereinafter described as a floor panel that is connected to a seat track 14, the panel can include other types of panels, such as the panels which form partitions within an aircraft cabin that define a lavatory or the galley, for example. As will be apparent to those skilled in the art, the panel assembly of these other embodiments of the present invention need not be attached to the seat track, but can be attached to other structures, if so desired.

Figure 11A:
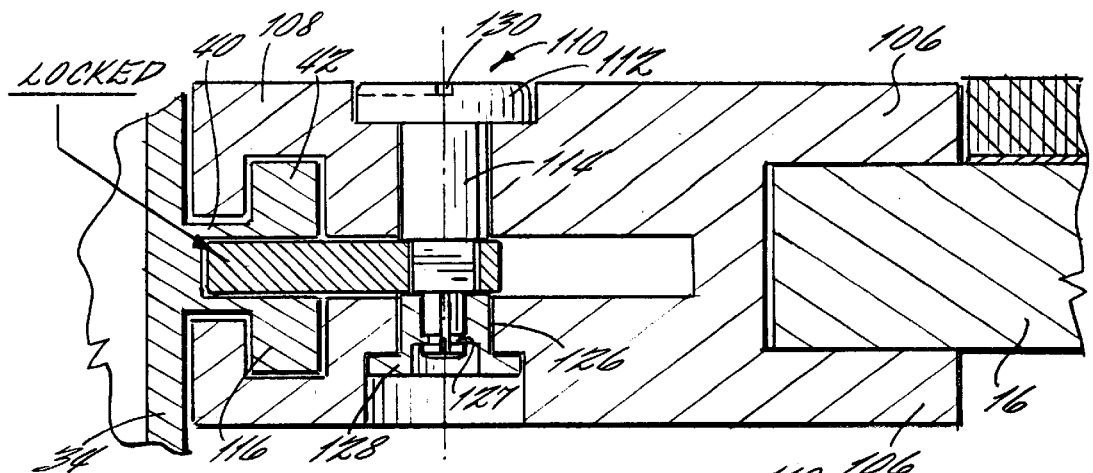
FIGS. 11A and 11B are fragmentary cross-sectional views of a portion of a panel assembly including a cam lock assembly according to one advantageous embodiment of the present invention in locked and unlocked positions, respectively.
Figure 11B:
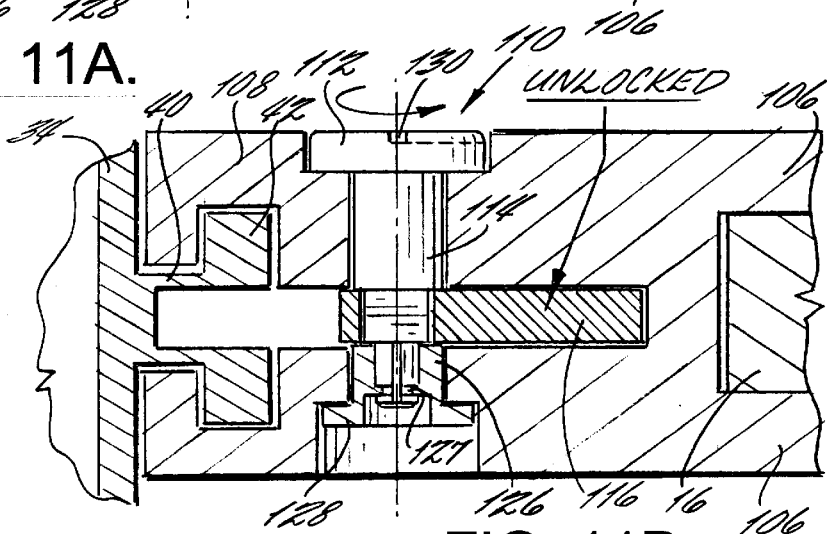
Figure 12:
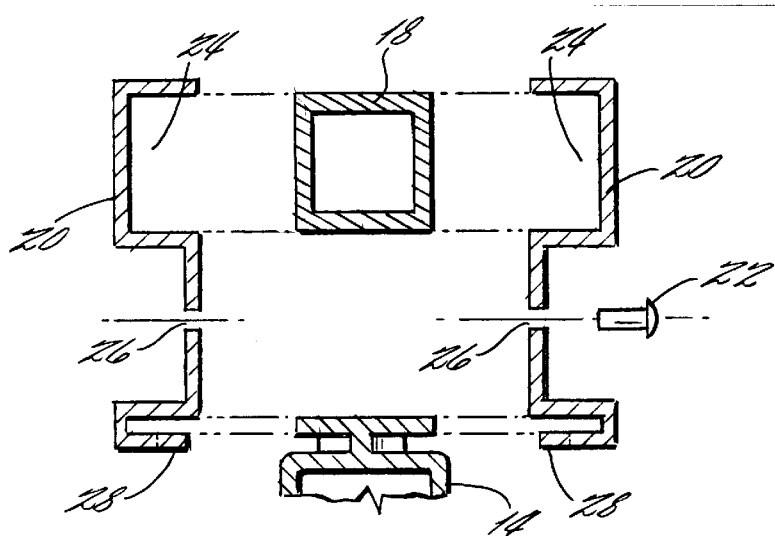
FIG. 12 is an exploded cross-sectional view of a portion of a seat track and the associated seat mounting components according to one advantageous embodiment of the present invention.

According to any of these embodiments, however, the rail 102 generally has an upstanding wall portion 104 and a number of flanges which extend outwardly in both directions from the wall portion as shown in cross section in FIGS. 11A and 11B. In particular, at least one flange 106 preferably extends in a direction toward the interior of the panel 16 to facilitate mounting of the rail along the edge of the panel, such as by means of an adhesive and/or a variety of mechanical fasteners. In addition, the rail includes at least one flange 108 extending outwardly in a direction away from the panel and, more preferably, a pair of flanges extending outwardly in a spaced apart relationship in a direction away from the panel as shown in FIGS. 11A and 11B. As shown in FIGS. 6 and 7, the flange extending outwardly from the lower side of the panel can advantageously be formed of a number of different flange segments spaced apart along the length of the rail at the same spacing as the lobes 38 that extend outwardly from a side portion 34 of the seat track. Although not illustrated, the flange extending outwardly from the upper side of the panel can also be formed of a number of different flange segments spaced apart along the length of the rail at the same spacing as the lobes that extend outwardly from a side portion of the seat track and in alignment with the flange segments that extend outwardly from the lower side of the panel. As described hereinafter, the flanges which extend outwardly from the wall portion of the rail facilitate engagement of the rail and, in turn, the panel to the seat track 14 and, more particularly, to the lobes 38 which extend outwardly from a side portion 34 of the U-shaped body portion of the seat track.

As illustrated in FIGS. 6 and 7, the panel assembly 98 also includes a number of cam lock assemblies 110, typically formed of steel or titanium, which engage both the rail 102 and the seat track 14, such as the lobes 38 which extend outwardly from a side portion 34 of the seat track. As shown, at least one of the flanges 108 that extends outwardly from the upper surface of the panel 16 includes a number of apertures for receiving respective ones of the cam lock assemblies. These apertures are spaced along the length of the flange at the same spacing as the lobes that extend outwardly from the side portion of the seat track.

Figures 8, 9, 10A, 10B, 10C:
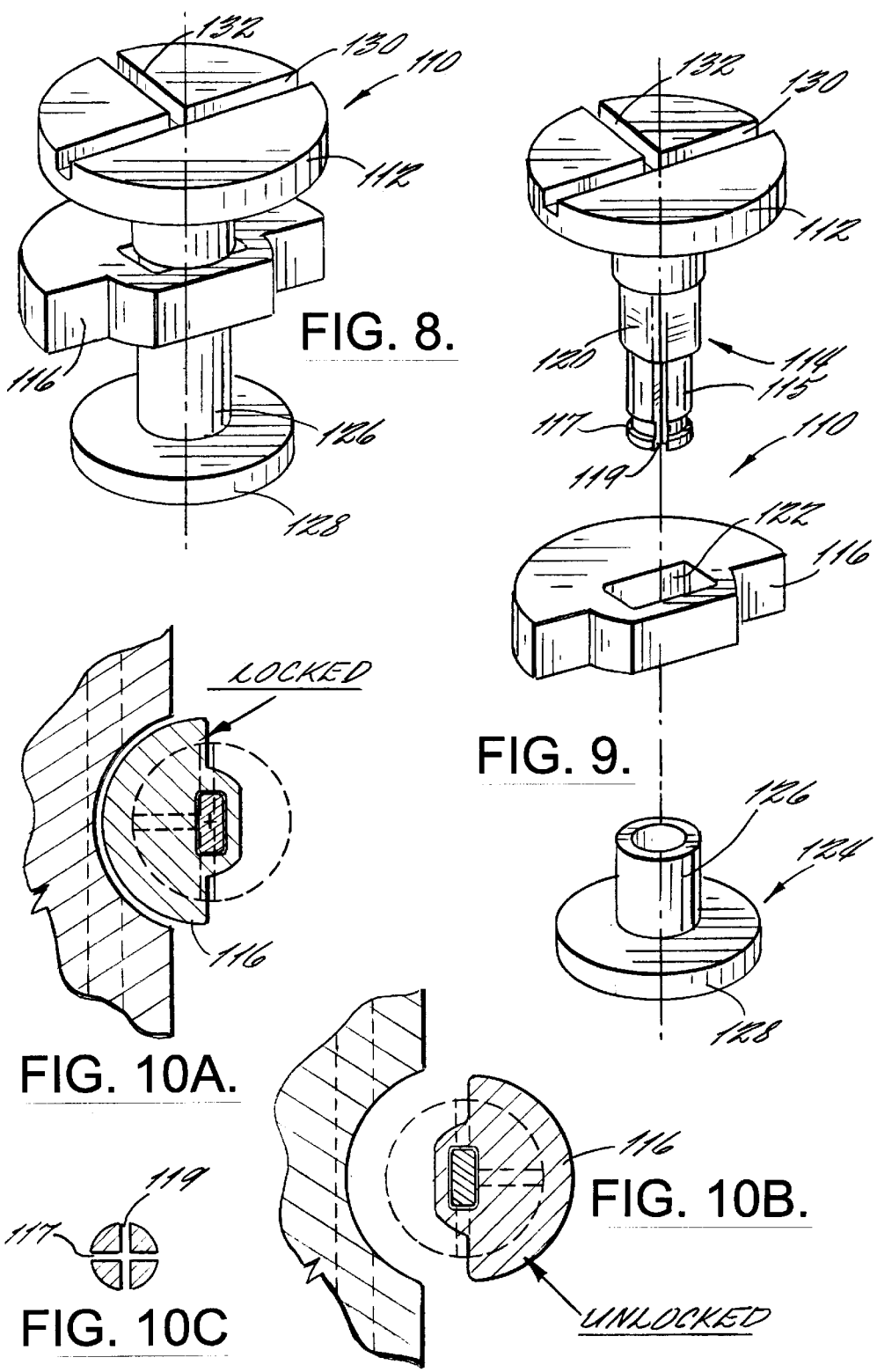
FIG. 8 is a perspective view of a cam lock assembly according to one embodiment of the present invention.
FIG. 9 is an exploded perspective view of the cam lock assembly of FIG. 8.
FIGS. 10A and 10B are fragmentary cross-sectional views of a cam lock assembly in locked and unlocked positions, respectively, relative to a seat track of one embodiment of the present invention.
FIG. 10C is a cross-sectional view of the end of the shaft portion of the cam lock assembly which illustrates the slits defined therein.

As shown in more detail in FIGS. 8 and 9, the cam lock assembly 110 includes a head portion 112, a shaft portion 114 extending outwardly from the head portion, and a semi-circular cam 116 mounted upon the shaft. As better shown in FIGS. 6 and 7, the shaft portion is positioned to extend through a respective aperture defined by the flange 108 of the rail 102. Typically, the flange of the rail also defines a recessed portion for receiving the head portion of the cam lock assembly such that the head portion is relatively flush with the exterior of the flange.

Once the shaft portion 114 has been inserted through an aperture 112 defined by the flange 108 of the rail 102, the semi-circular cam 116 is mounted upon the shaft portion such that the cam rotates with the shaft portion. In this regard, the shaft portion can include a medial portion 120 having a generally rectangularly shaped lateral cross sectional shape. The cam also therefore defines a generally rectangularly shaped aperture 122 that is sized and shaped to match the rectangularly shaped medial portion of the shaft portion. As such, the cam can be mounted upon the medial portion of the shaft portion so as to rotate therewith.

The cam lock assembly 110 can also include a base 124 for mounting upon the end 115 of the shaft portion 114 opposite the head portion 112 to thereby secure the cam 116 upon the shaft. As shown in FIG. 9, the end of the shaft portion opposite the head portion generally has a circular lateral cross-sectional shape. As also shown, the base generally includes a tubular portion 126 for receiving the end of the shaft portion opposite the head portion. The tubular portion is typically open at one end and defines an internal shape, i.e., circular, that matches the shape of the end of the shaft portion opposite the head portion.

In particular, the end 115 of the shaft portion 114 opposite the head portion 112 preferably defines a reduced diameter portion 117 and at least one and, more preferably, a pair of orthogonal slits 119 extending longitudinally from the end of the shaft portion opposite the head portion through at least the reduced diameter portion. See FIG. 10C. The slits defined by the end of the shaft portion opposite the head portion preferably extend laterally completely across the end of the shaft portion opposite the head portion to thereby permit the end of the shaft portion opposite the head portion to flex or compress somewhat as the base 124 is mounted thereto. In this regard, the interior opening defined by the tubular portion 126 of the base preferably defines an inwardly extending rib 127 for engaging the reduced diameter portion of the end of the shaft portion opposite the head portion as shown in FIGS. 11A and 11B. Thus, the base can be securely mounted upon the end of the shaft portion opposite the head portion.

The base 124 also preferably includes an enlarged end portion 128 mounted to the end of the tubular portion 126 opposite the open end. As also shown in FIGS. 11A and 11B, the rail 102 preferably defines a recess for receiving the enlarged end portion of the base such that the enlarged end portion of the base is either recessed or flush mounted relative to the exterior of the rail.

In order to attach a floor panel 16 to a seat track 14, for example, the shaft portion 114 of the cam lock assembly 110 is extended through the aperture 112 defined by the flange 108 of the rail 102 and the cam 116 and the base 124 are mounted upon the shaft portion. As such, in the embodiment in which the rail includes a pair of flanges extending in a direction away from the panel, the cam is disposed between the flanges. The cam lock assembly is also initially positioned such that the semi-circular cam is directed toward the panel as shown in the unlocked position of FIGS. 10B and 11B.

The panel assembly 98 is then placed adjacent the other structure to which it is to be interconnected, such as a seat track 14 as shown in FIGS. 6 and 7. In positioning the panel assembly relative to the seat track, the flanges 108 which extend outwardly from the rail 102 are generally positioned on the opposite sides of the lobes 38, i.e., above and below the lobes, which extend outwardly from the side portion 34 of the U-shaped body portion of the seat track. In addition, the panel assembly is positioned such that the cam lock assemblies 110 are positioned immediately adjacent respective lobes of the seat track.

Thereafter, the head portion 112 of each cam lock assembly 110 is rotated such that the semi-circular cam 116 also rotates into the locked position so as to extend outwardly from the panel assembly 98 and into engagement with the recessed portion 96 defined by the respective lobe 38 of the seat track 14 as shown in FIGS. 10A and 11A. As such, the panel assembly engages the seat track so as to effectively limit undesirable movement the panel 16 relative to the seat track.

In order to facilitate rotation of cam lock assembly 110, the head portion 112 preferably includes at least one slot 130 for engagement by an appropriate tool, such as a screwdriver. In addition, the head portion can include indicia 132, such as another slot, indicative of the direction of the semi-circular cam 116 such that an installer can quickly determine by visual inspection whether the semi-circular cam is positioned so as to engage the respective lobe 38 of the seat track 14.

As described above, the panel assembly 98 of the present invention, including the cam lock assembly 110, can be utilized to attach a variety of panels to a variety of other structures, in addition to the seat track 14 of the present invention. In this regard, the panel assembly can be utilized to form partitions which define, for example, lavatories or galleys within an aircraft cabin 10.

As therefore described above, the interlocking assembly system of the present invention also permits panels 16, such as floor panels, to be securely connected to adjacent structures, such as the seat track 14 of the present invention with very few components, thereby simplifying the installation procedure and reducing the time required to mount the panels. The interlocking assembly system of the present invention also permits the cam lock assemblies 110 to be readily removed, if desired, in order to remove the panels in an efficient manner without damaging the cam lock assembly, the panel or the seat track.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An interlocking seat track assembly system, comprising:

a floor beam having an upper surface extending between opposed edges;

a clip comprising first and second clip members, said first clip member including a beam attachment portion and an elongate tongue extending away from said beam attachment portion, said second clip member including a beam attachment portion and two elongate rails extending away from said beam attachment portion and spaced apart to define a lengthwise extending channel therebetween, said lengthwise extending channel being sized to slidably receive said elongate tongue such that the respective beam attachment portions of said first and second clip members engage said floor beam, wherein each elongate rail includes a lengthwise extending lip adapted to engage a corresponding lip of a seat track such that said seat track is thereby securely mounted to the floor beam by said clip; and a seat track comprising a body portion having a U-shape that defines an inner channel, said body portion comprising an inner sidewall and an opposed outer sidewall, wherein a pair of tabs extend inwardly from opposed portions of said inner sidewall into said inner channel, said tabs adapted to engage corresponding lips of said clip for mounting said seat track to said floor beam, and wherein a plurality of lobes extend outwardly from said outer sidewall, said plurality of lobes adapted to securely engage components selected from a group including floor panels and seats.

2. An interlocking seat track assembly system according to claim 1 wherein said floor beam defines a notch in each opposed edge for engaging said beam attachment portion of said respective clip member to thereby prevent displacement in a direction transverse to said lengthwise extending channel of said first and second clip members.

3. An interlocking seat track assembly system according to claim 2 wherein each notch has a predetermined depth, and wherein each beam attachment portion has a predetermined thickness substantially equal to the predetermined depth of said respective notch.

4. An interlocking seat track assembly system according to claim 1 wherein each lobe comprises a stem and an outer bulbous structure, wherein said stem extends outwardly from said outer sidewall to said outer bulbous structure, and wherein at least one stem has a scalloped construction.

5. An interlocking seat track assembly system according to claim 1 wherein each lobe comprises a stem and an outer bulbous structure, wherein at least one outer bulbous structure includes a recessed portion which cooperably interacts with a fastener to secure a floor panel to said seat track.

6. An interlocking seat track assembly system according to claim 1 wherein said second clip member further includes a tab extending away from said beam attachment portion in a direction opposite said rails, said tab defining a hole therethrough, and wherein said elongate tongue of said first clip member defines a hole positioned such that said holes are aligned once said elongate tongue is slidably received within the lengthwise extending channel of said second clip member in order to receive a fastener.

7. An interlocking seat track assembly system according to claim 1 wherein each beam attachment portion includes an inwardly extending sill that slidably engages said opposed edges of a lower surface of said floor beam to securely mount said seat track to said floor beam.

8. A seat track comprising:
a body portion having a U-shape that defines an inner channel, said body portion comprising an inner sidewall and an opposed outer sidewall;

a plurality of lobes comprising a stem and an outer bulbous structure wherein said lobes extend outwardly from said outer sidewall to securely engage components selected from a group including floor panels and seats.

9. A seat track according to claim 8 wherein said outer bulbous structure of at least one lobe includes a recessed portion that cooperably interacts with a fastener to securably engage a floor panel.

10. A seat track according to claim 9 wherein said U-shaped body portion includes a connecting portion and a pair of side portions connected to opposed ends of said connecting portion, and wherein said at least one lobe having an outer bulbous structure that includes a recessed portion extends outwardly from a side portion of said U-shaped body portion.

11. A seat track according to claim 8 wherein said stem of at least one lobe has a scalloped construction.

12. A seat track according to claim 11 wherein said U-shaped body portion includes a connecting portion and a pair of side portions connected to opposed ends of said connecting portion, and wherein said at least one lobe having a scalloped construction extends outwardly from said connecting portion of said U-shaped body portion.

13. A seat track according to claim 8 further comprising a pair of tabs extending inwardly from opposed portions of said inner sidewall into said inner channel, said tabs adapted to engage corresponding lips of a clip for mounting the seat track to a floor beam.

14. A clip for mounting a seat track to a floor beam, the clip comprising:

first and second clip members, said first clip member including a beam attachment portion and an elongate tongue extending away from said beam attachment portion, said second clip member including a beam attachment portion and two elongate rails extending away from said beam attachment portion and spaced apart to define a lengthwise extending channel therebetween, said lengthwise extending channel being sized to slidably receive said elongate tongue such that the respective beam attachment portions of said first and second clip members engage the floor beam, wherein each elongate rail includes a lengthwise extending lip adapted to engage a corresponding tab of the seat track such that the seat track is thereby securely mounted to the floor beam by said clip; and a fastener for connecting said first and second clip members.

15. A clip according to claim 14 wherein said second clip member further includes a tab extending away from said beam attachment portion in a direction opposite said rails, said tab defining a hole therethrough; and wherein said elongate tongue of said first clip member defines a hole positioned such that said holes are aligned once said elongate tongue is slidably received within the lengthwise extending channel of said second clip member in order to receive said fastener.

16. A clip according to claim 14 wherein each beam attachment portion includes an inward sill that slidably engages said opposed edges of the floor beam to securely mount the seat track to the floor beam.

* * * * *